United States Patent [19]
Park et al.

[11] Patent Number: 6,148,116
[45] Date of Patent: Nov. 14, 2000

[54] METHOD AND CIRCUIT FOR ADAPTIVELY ENHANCING CONTOUR COMPONENTS OF A LUMINANCE SIGNAL

[75] Inventors: Yong-cheol Park, Seoul; Si-young Chin, Incheon, both of Rep. of Korea

[73] Assignee: Samsung Electronics, Co., Ltd., Suwon, Rep. of Korea

[21] Appl. No.: 08/977,856

[22] Filed: Nov. 25, 1997

[30] Foreign Application Priority Data

Nov. 29, 1996 [KR] Rep. of Korea ..................... 96/59842

[51] Int. Cl.[7] ..................................................... G06K 9/40
[52] U.S. Cl. ........................ 382/266; 382/254; 348/606; 348/623; 348/627
[58] Field of Search ................... 382/266, 254; 348/627, 623, 618, 606, 607

[56] References Cited

U.S. PATENT DOCUMENTS

| | | | |
|---|---|---|---|
| 3,789,133 | 1/1974 | Kline | 348/627 |
| 4,437,124 | 3/1984 | Cochran | 348/623 |
| 4,536,796 | 8/1995 | Harlan | 348/627 |
| 4,573,075 | 2/1986 | Bolger | 348/627 |

*Primary Examiner*—Thomas D. Lee
*Attorney, Agent, or Firm*—Marger Johnson & McCollom, P.C.

[57] ABSTRACT

A contour enhancement method and circuit for adaptively enhancing a contour component of a luminance signal. In the method, a coring operation is performed with respect to the contour component. For the coring operation, a coring value is used which is adjusted according to characteristics of the contour component detected from an input luminance signal. The cored contour component is amplified by a predetermined gain, and the level of the gain-controlled contour component is limited to a predetermined threshold value to output a level-limited contour component. The level-limited contour component is then added to the input luminance signal to become a contour-enhanced luminance signal.

12 Claims, 5 Drawing Sheets

METHOD AND CIRCUIT FOR ADAPTIVELY ENHANCING CONTOUR COMPONENTS OF A LUMINANCE SIGNAL

BACKGROUND OF THE INVENTION

1. Field of the Invention

The present invention relates to image signal processing, and more particularly, to a method and circuit for correcting contour components of a luminance signal.

The present application is based on Korea Patent Application No. 96-59842 which is incorporated herein by reference for all purposes.

2. Description of the Related Arts

Spatial frequency is a measure of how rapidly a parameter changes with respect to position. When the spatial frequency is determined in a prescribed spatial direction, it is analogous to temporal frequency, which is a measure of how rapidly a parameter changes with respect to time. In television systems using horizontal scanning lines, horizontal space can be conformably mapped into time by the scanning process, so that horizontal spatial frequency of the image intensity is mapped into temporal frequency in the video signal describing the image.

In video cameras using a single pickup device, a color pattern filter can be used to filter light reaching the pickup device so that a color signal can be extracted from the electrical signal output by the pickup device. The color pattern filter usually includes stripes capable of transmitting light of three different colors to the pickup device, which can be a vidicon or may be a solid-state imager such as a line-transfer charge-coupled device. The direction of the stripes is perpendicular to the direction of scanning line in the camera, which usually is in a horizontal direction. The stripes of the same color have uniform width, but the stripes of different colors preferably have different widths in order to simplify the separation of color components from the output signal of the pickup device. The respective width associated with each color is usually scaled according to the contribution of the color to a total luminance signal. If the color filter, for example, includes red-transmissive, green transmissive and blue-transmissive stripes, the green-transmissive stripes (which contribute the most to the luminance of the signal) will be the widest and the blue-transmissive stripes (contributing the least) will be the narrowest. The signals picked up by the narrower width stripes have poorer signal-to-noise ratio (S/N), particularly in the higher horizontal spatial frequencies containing contour information. When a video camera is used with a video transmission system, the color signals are converted to wideband luminance and narrow-band color-difference signals. The poorer S/N ratios of the individual colors which contribute less to the luminance are not of much concern since contour enhancement or video peaking is usually carried out on shared luminance high frequencies rather than on individual color signals.

However, video equipment exists in which the color signals are not combined to form luminance and color-difference signals, e.g., a RGB-type digital video transmission system in which the red (R), green (G) and blue (B) signals are separately digitized and coded. In such equipment, contour enhancement or video peaking is commonly carried out for the red (R), green (G) and blue (B) color signals themselves. If a color contour that has poorer S/N is corrected with another color contour that has better S/N, an image that has less apparent noise can be obtained. A random noise in the green (G) color signal is not correlated with random noises in the red (R) or blue (B) color signals. Thus, if a random noise component in the G signal and a random noise component in another color signal is added by orthogonal vectors rather than inphase vectors, the S/N characteristics in the high-frequency band are enhanced during contour correction of the other color signal.

In a conventional method for enhancing the contour components of the luminance signal, contour components in a horizontal and vertical directions are detected and added, and the added result is combined with the original signal.

FIG. 1 is a block diagram of a conventional circuit for enhancing contour components of a luminance signal. FIG. 2 shows the input-out characteristic of a non-linear processor in the circuit of FIG. 1.

In the circuit of FIG. 1, the contour detecting filter 11 receives an original luminance signal and performs a band-pass filtering operation to detect horizontal contour components. The characteristics of the contour detecting filter 11 may be designed according to the specification of a processing system. Usually, a traversal filter having coefficients symmetrical against a center coefficient is used. One example of a simple contour detecting filter 11 that can be used is a 3-tap band-pass filter whose coefficients are −0.5, 1 and 0.5.

Higher levels in the output signals of the contour detecting filter 11 may be regarded as the horizontal contour components while lower levels may be regarded as noise, etc. If the lower level components are enhanced, the noise component is emphasized and the picture quality deteriorates. The coring processor 13a eliminates low-level contour components among the horizontal contour components by outputting zero-level when a signal level is lower than a coring value and outputting the signal level subtracted by the coring value when the signal level is higher than the coring value. This coring value is an externally-preset parameter.

In the prior art, the coring value is typically set to a fixed value by the manufacturer. Accordingly, if there is much noise in the signal, the performance of the contour adjustment deteriorates because the noise component which is larger than the coring value is regarded as the contour component. On the other hand, if there is little noise in the signal, the detection of the contour component is ineffective because the contour component which is smaller than the coring value is ignored.

The gain processor 13b multiplies the output of the coring processor 13a by a gain, which is another externally-preset parameter, to control the gain of the signal output by the coring processor 13a. The limiter 13c limits the gain-controlled contour components within a predetermined threshold value by clipping the gain-controlled contour components according to the threshold value or a limiting value which is another externally-preset parameter.

As described above, the coring processor 13a, gain processor 13b and limiter 13c are referred to collectively as a nonlinear processor 13. This processor 13 carries out non-linear processing of the contour components according to the preset coring, gain and clipping threshold values.

Meanwhile, the vertical contour components, which are detected only in a system employing a line memory (not shown), are detected by calculating the difference between a current pixel and a corresponding pixel in an adjacent line. The vertical contour components are added to the horizontal contour component to yield a contour component signal of the pixel. In general, however, signal processing is carried out only for the horizontal contour components and not vertical contour components in order to reduce the hardware required, i.e., a line memory, etc., in a simplified image processing system.

The contour components signal detected by the contour detecting filter 11 and processed by the non-linear processor 13 are added to the original luminance signal in an adder 15 to become a contour-enhanced luminance signal which is known to improve the picture quality.

According to the aforementioned conventional technology, an image signal with improved picture quality can be obtained by enhancing the contour components of a luminance signal. Here, the types of contour detecting filters used can be varied by known means depending on the desired characteristics of the system. Also, the gain processor and limiter of the non-linear processor may be modified by adjusting the gain and the threshold value.

However, if the externally supplied coring value of the coring processor is a fixed value, the contour enhancement effect is reduced depending on image characteristics. In other words, if a small coring value is set, the noise components of the image are also contour-enhanced, which emphasizes the noise. On the other hand, if a large coring value is set, the value obtained by subtracting the coring value from the actual contour components can suppress the actual contour components as well as.

Accordingly, the need remains for a system and method for adaptively enhancing contour components according to image characteristics by performing a coring operation with respect to a contour component by use of a coring value which is adjusted such that the value depends on the noise figure of the input luminance signal.

SUMMARY OF THE INVENTION

A contour enhancement method for adaptively enhancing a contour component of a luminance signal according to the present invention comprises first receiving a luminance signal and detecting its contour component. The contour component is then cored using a coring value dependant upon a level of the input luminance signal to output a cored contour component. The cored contour component is then amplified by a predetermined gain to output a gain-controlled contour component. The inventive method also includes limiting the level of the gain-controlled contour component to a predetermined threshold value to output a level-limited contour component; and adding the level-limited contour component to the input luminance signal to output a contour-enhanced luminance signal.

A contour enhancement circuit constructed according to the present invention comprises a contour detector for detecting a contour component from an input luminance signal; a coring value generator for generating a coring value according to the characteristics of the detected contour component; a non-linear processor for coring the detected contour component with the coring value, amplifying the cored contour component by a predetermined gain, and limiting the level of the gain-controlled contour component to a predetermined threshold value; and an adder for adding the non-linearly processed contour component to the input luminance signal to output a contour-enhanced luminance signal.

BRIEF DESCRIPTION OF THE DRAWINGS

The above objects and advantages of the present invention will become more apparent by describing a preferred embodiment thereof with reference to the attached drawings in which.

DETAILED DESCRIPTION OF THE PREFERRED EMBODIMENTS

Figure 1:
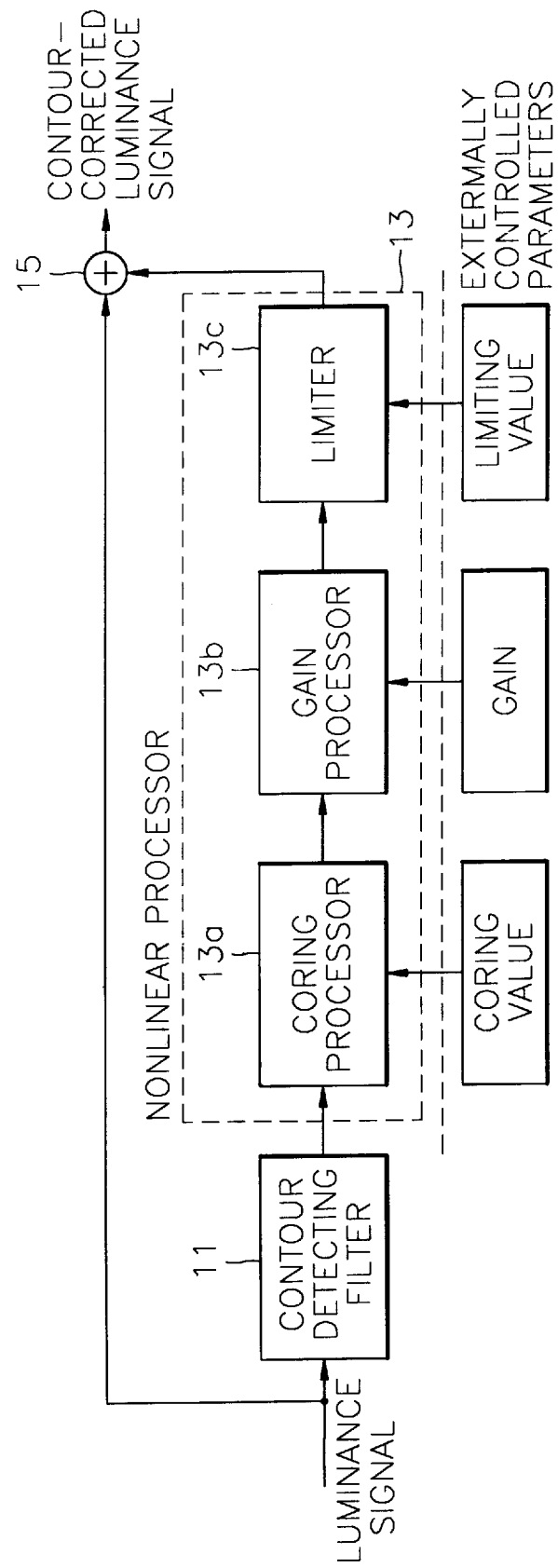
FIG. 1 is a block diagram of a conventional circuit for enhancing contour components of a luminance signal.
Figure 2:
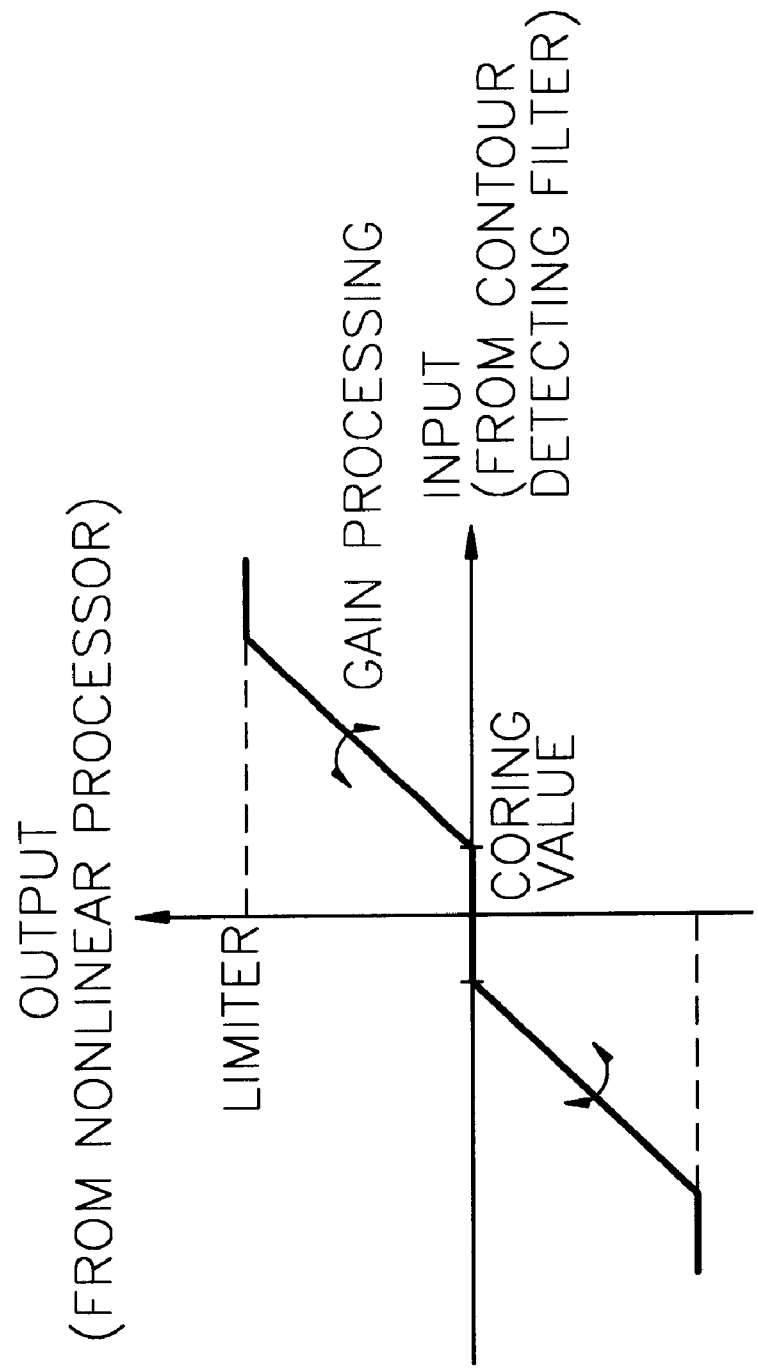
FIG. 2 shows the input/output characteristic of the non-linear processor circuit of FIG. 1.
Figure 3:
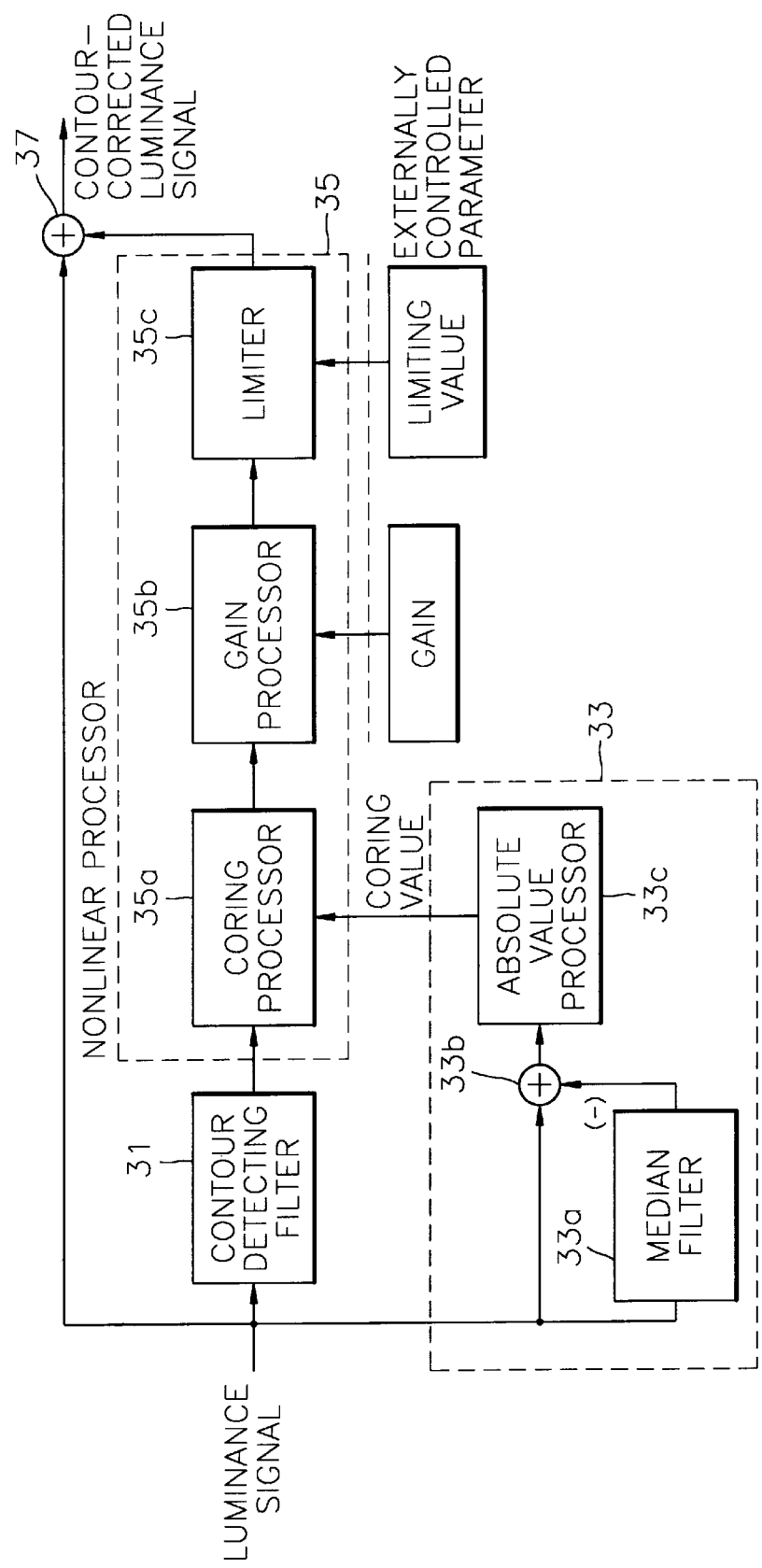
FIG. 3 is a block diagram of a first embodiment of a contour enhancement circuit constructed according to the present invention.

The contour enhancement circuit shown in FIG. 3 includes a contour detecting filter 31 for detecting contour components of an input luminance signal. A coring value generator 33 receives the luminance signal and generates a coring value according to characteristics of the input luminance signal and outputs such signal to non-linear processor 35. The non-linear processor 35 performs a non-linear processing step with respect to the contour components detected from the contour detecting filter 31. An adder 37 adds the non-linearly processed contour components to the luminance signal and outputs a contour corrected luminance signal according to the present invention.

The coring value generator 33 includes a median filter 33a, a subtractor 33b and an absolute value processor 33c. Meanwhile, the non-linear processor 35 includes a coring processor 35a, a gain processor 35b and a limiter 35c.

Figure 5:
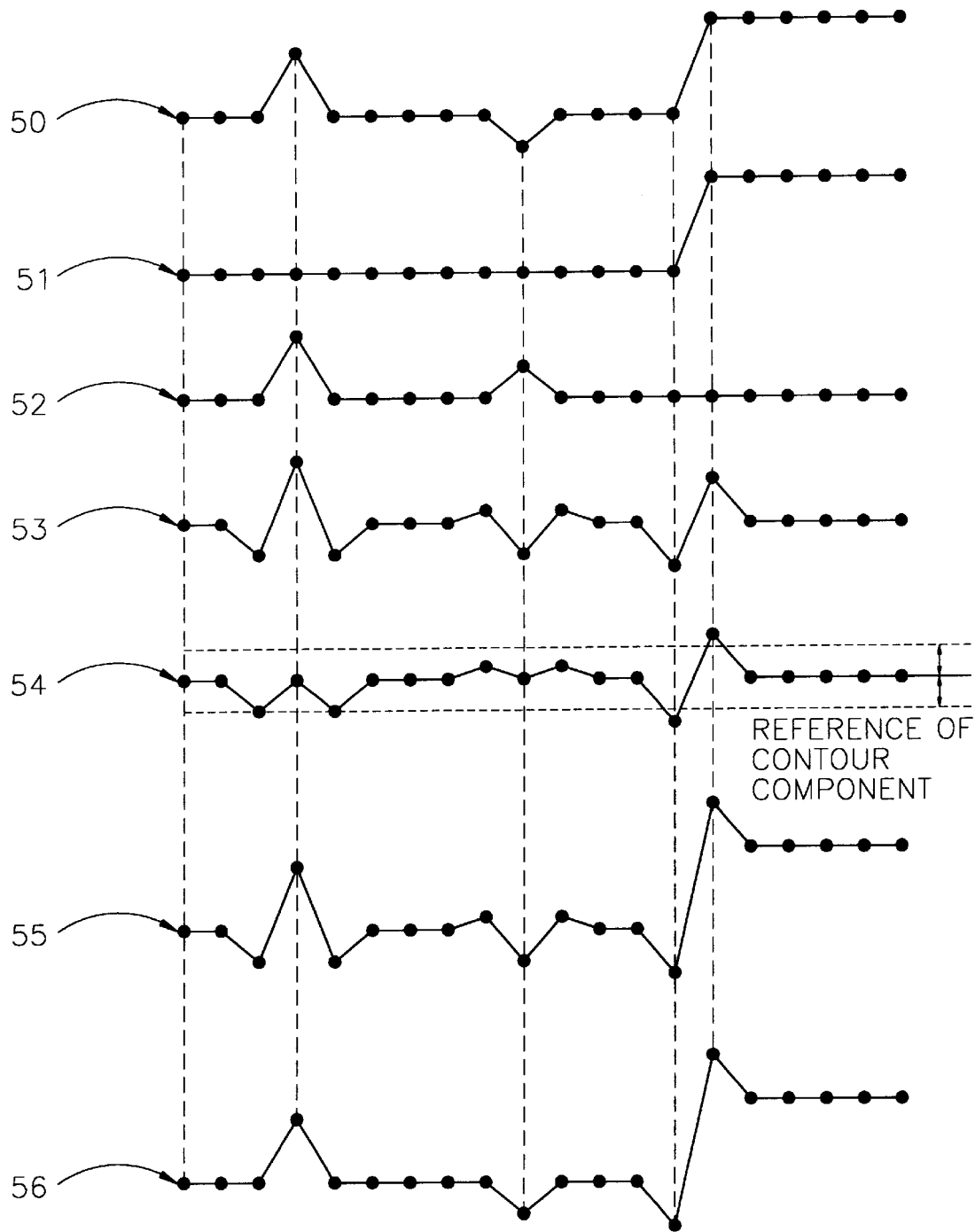
FIG. 5 illustrates waveform diagrams of signals to or from various parts of the contour enhancement circuits of FIGS. 3 and 4.

FIG. 5 illustrates operational waveform diagrams of various parts of the contour component enhancement circuit shown in FIG. 3. Specifically, luminance signal line 50 shows an input luminance signal, luminance signal line 51 shows an output of the median filters 33a, luminance signal line 52 shows a coring value generated in the coring value generator 33, luminance signal line 53 shows an output from the contour detecting filter 31 or 41, luminance signal line 54 shows an output from the coring processor 35a, and luminance signal line 55 shows an output of the contour enhancement circuit of FIG. 3.

The operation of the contour enhancement circuit of FIG. 3 will now be described with reference also to FIG. 5.

The contour detecting filter 31 detects contour components of an input luminance signal to output the detected contour components to the nonlinear processor 35.

The coring value generator 33 generates a coring value which adaptively changes in accordance with the characteristics of the luminance signal. Here, the median filter 33a in the coring value generator 33 eliminates a spark noise from the input luminance signal (e.g. the first two peaks of luminance signal line 50) and outputs a noise-removed (luminance signal line 51) signal to the subtractor 33b. The median filter 33a determines a median value of the luminance signals, and eliminates spark noise components by using such filters as are well known to those skilled in the art.

The subtractor 33b subtracts the noise-removed signal from the median filter 33a and outputs the subtracted result to the absolute value processor 33c. The absolute value processor 33c generates a coring value (luminance signal line 52) by calculating an absolute value of the signal output by the subtractor 33b. This coring value is output to the coring processor 35a and is used as the reference signal for coring the contour components. The coring value is generated for each pixel. This resulting coring value generated by the core value generator 33 and applied to the contoured signal is high during noise-infected portions of the contour components, and low during noise-free portions.

The coring processor 35a, gain processor 35b and limiter 35c of the non-linear processor 35 performs a non-linear processing with respect to the contour components detected by the contour detecting filter 31 and outputs the processed contour components to the adder 37. Here, the coring processor 35a carries out a coring operation with respect to the contour components output by the contour detecting filter 31 according to the coring value output from the coring value generator 33. Consequently, the resulting contour enhancement is suppressed at a portion where noise components exist, and contour components are enhanced at a noise-free portion, thereby yielding an optimum contour enhancement.

The adder 37 adds the contour components output by the non-linear processor 35 to the original input luminance signal to output a finally contour enhanced luminance signal.

FIG. 5 illustrates waveform diagrams of signals to or from various parts of the contour enhancement circuit of FIG. 3. Signal delay in each component has not taken into consideration for the sake of simplicity.

Luminance signal line 50 shows an example of an input luminance signal, in which the fourth and tenth samples are regarded as spark noise components and the fourteenth and fifteenth samples are regarded as contour components. Luminance signal line 51 shows signals output by the median filter 33a, in the case that the number of taps of the median filter 33a is 3. Luminance signal line 52 shows coring values, which are obtained by subtracting the output of the median filter 33a from the input luminance signal and calculating the absolute value of the subtraction result. Luminance signal line 53 shows contour components detected from the contour detecting filter 31, in which a 3-tap bandpass filter is used having filter coefficients of −0.5, 1 and 0.5. Luminance signal line 54 shows the cored contour components obtained by coring the contour components detected from the contour detecting filter 31 in accordance with the coring value from the coring value generator 33. Luminance signal line 55 shows the contour-corrected luminance signal which is finally output by the adder 37. In the contour-corrected luminance signal, the contour enhancement is not performed on the spark noise but only on the actual contour components. Therefore, efficient performance of contour enhancement can be obtained.

However, referring to luminance signal line 55, it can be seen that the pixels around the spark noise components are slightly affected by the spark noise, which is due to the coefficients of the contour detecting filter 31.

Figure 4:
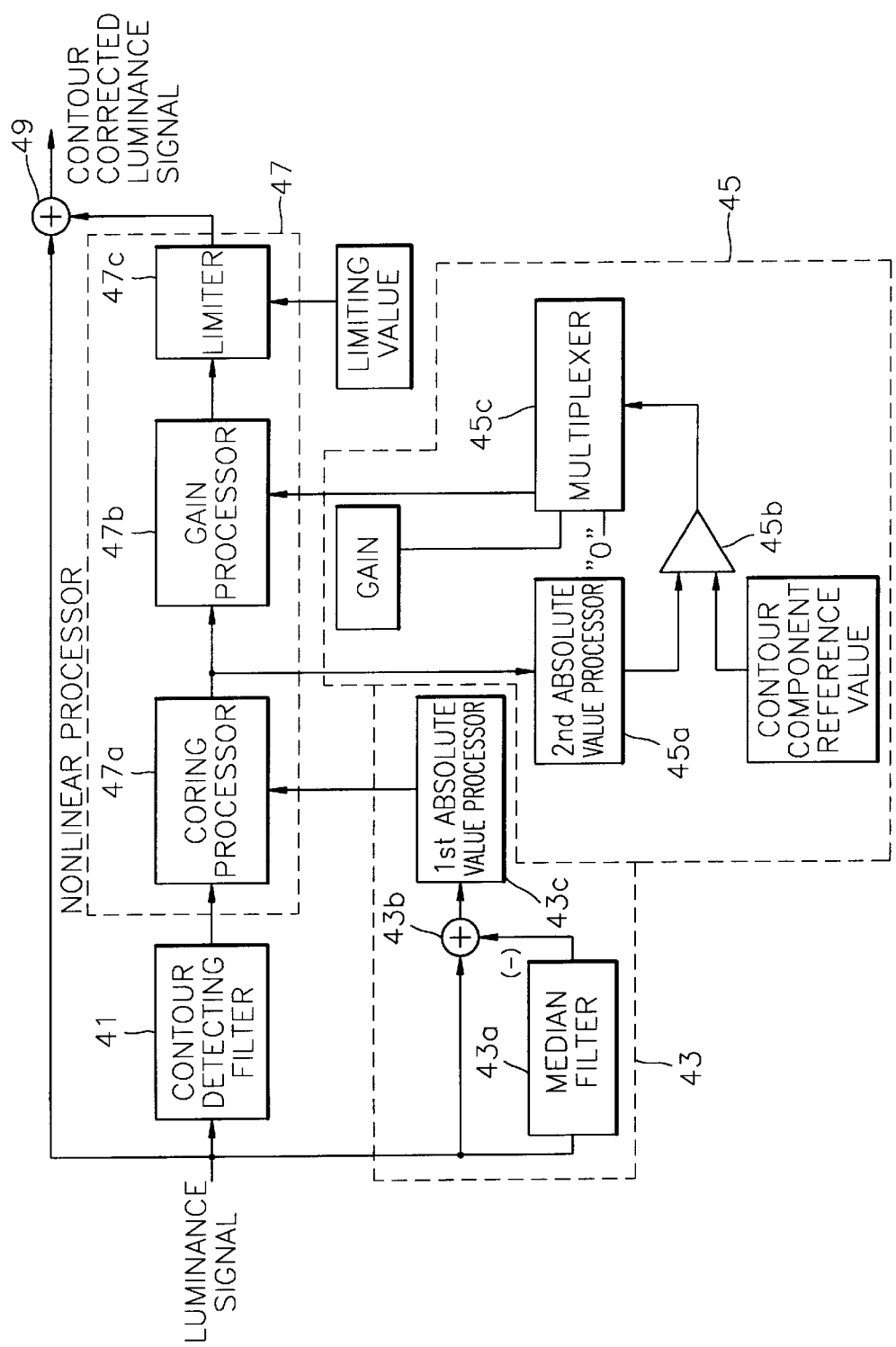
FIG. 4 is a block diagram of a second embodiment of contour enhancement circuit constructed according to the present invention.

FIG. 4 shows a second embodiment of a preferred contour enhancement circuit constructed according to the present invention, which confers added features over the circuit of FIG. 3.

The circuit of FIG. 4 includes a contour detecting filter 41 for detecting contour components of an input luminance signal. A coring value generator 43 generates a coring value according to characteristics of the input luminance signal (namely, the noise figure) and applies the coring value to a non-linear processor 47. A gain generator 45 generates a gain dependent upon a comparison of the cored contour components with a reference value. Non-linear processor 47 performs a non-linear processing with respect to the contour components detected from the contour detecting filter 41. Finally, an adder 49 adds the non-linearly processed contour components to the luminance signal and outputs the contour corrected luminance signal.

The coring value generator 43 includes a median filter 43a, a subtractor 43b and a first absolute value processor 43c. The gain generator 45 includes a second absolute value processor 45a, a comparator 45b and a multiplexer 45c. The non-linear processor 47 includes a coring processor 47a, a gain processor 47b and a limiter 47c.

In the second embodiment of the present invention, the structures and the operations of the contour detecting filter 41, the coring value generator 43, the non-linear processor 47 and the adder 49 are similar to those in the first embodiment shown in FIG. 3. Thus, the detailed description thereof will be omitted herein.

In the gain generator 45, the second absolute value processor 45a calculates the absolute value of the output signal of the coring processor 47a and applies the same to one input end of the comparator 45b. The comparator 45b compares the output of the second absolute value processor 45a with a contour component reference value which is input via the other input end thereof, and applies the compared result to the multiplexer 45c as a selection control signal. The optimal contour component reference value is different depending upon the particular type of video equipment used. However, such a value can be determined by the manufacturer or end-user of the video equipment without undue experimentation.

The multiplexer 45c selectively outputs zero or a predetermined externally controlled non-zero gain parameter to the gain processor 47b in accordance with the selection signal. In other words, the multiplexer 45c identifies the cored contour component as a noise component and outputs the gain of zero when the cored contour component is smaller than the reference value, while outputting the non-zero gain value when the cored contour component is greater than the reference value. Thus, the effect of the spark noise on adjacent pixels can be suppressed.

The illustration of luminance signal lines 50 through 54, which was provided in connection of the contour component enhancement circuit of FIG. 3, can be applied to the circuit of FIG. 4. Meanwhile, luminance signal line 56 shows the contour-corrected luminance signal for the input luminance signal of luminance signal line 50 which is finally output by the contour enhancement circuit of FIG. 4. The circuit of FIG. 4 operates to apply the gain differentially for a noise component and an actual contour component of the cored contour components. In other words, the contour enhancement is only performed with respect to the pixels identified as having an actual contour component so that the effect of the spark noise on the adjacent pixels is eliminated.

The circuits and methods disclosed herein enhance luminance contour and suppress noise components by adjusting a coring value responsive to an input luminance signal. The contour enhancement of the noise components can be further suppressed while emphasizing the actual contour components by comparing the cored contour components with a predetermined reference value and controlling the gain of the gain processor thereby.

Having described and illustrated the principles of the invention in a preferred embodiment thereof, it should be apparent that the invention can be modified in arrangement and detail without departing from such principles. We claim all modifications and variation coming within the spirit and scope of the following claims.

What is claimed is:

1. A contour enhancement method for adaptively enhancing a contour component of a luminance signal, comprising the steps of:

receiving a luminance signal;

detecting a contour component of said luminance signal;

filtering the noise component of said luminance signal;

adaptively generating a coring value dependant upon a level of said luminance signal and the filtered result;

coring said contour component using said coring value to output a cored contour component;

amplifying the cored contour component to output a gain-controlled contour component;

limiting the gain-controlled contour component to a threshold value to output a level-limited contour component; and adding the level-limited contour component to the luminance signal to output a contour-enhanced luminance signal.

2. The contour enhancement method according to claim 1, wherein the amplifying step includes amplifying the cored contour component by a predetermined gain to output a gain-controlled contour component.

3. The contour enhancement method according to claim 1, wherein the amplifying step includes:

comparing the cored contour component with a predetermined reference value to yield a compared value;

setting a gain based upon the compared value; and amplifying the cored contour component by the gain.

4. The contour enhancement method according to claim 3, wherein the step of setting the gain includes:

setting a zero gain if the cored contour component is smaller than the reference value; and setting a non-zero gain if the cored contour component is greater than the reference value.

5. The contour enhancement method according to claim 1, wherein the filtering step includes median-filtering said luminance signal to output a median value.

6. The counter enhancement method according to claim 5, wherein the adaptively generating step includes:

subtracting said median value from said luminance signal to output a subtracted result; and calculating an absolute value of said subtracted result.

7. A contour enhancement circuit for adaptively enhancing a contour component of a luminance signal, comprising:

a contour detector for detecting a contour component from an input luminance signal;

a coring value generator for adaptively generating a coring value responsive to the input luminance signal, the coring value generator filtering the noise component of the luminance signal;

a non-linear processor adapted to receive the contour component from the contour detector and output a non-linearly processed contour component responsive to the coring value generator; and an adder for adding the non-linearly processed contour component to the input luminance signal to output a contour-enhanced luminance signal.

8. The contour enhancement circuit according to claim 7, wherein the non-linear processor includes:

a coring processor for coring the detected contour component with the coring value and outputting a cored contour component;

a gain processor for amplifying the cored contour component by a gain value and outputting a gain-controlled contour component; and a limiter for limiting the level of the gain-controlled contour component to a predetermined threshold value and outputting the non-linearly processed contour component.

9. The contour enhancement circuit as claimed in claim 8, wherein the gain value used by the gain processor for amplifying the cored contour component is a predetermined number.

10. The contour enhancement circuit as claimed in claim 8, further including a gain generator for generating a gain value depending on an amplitude of the cored contour component.

11. The contour enhancement circuit as claimed in claim 10, wherein said gain generator comprises:

an absolute value processor for calculating an absolute value of the cored contour component;

a comparator for comparing the output of said absolute value processor with a predetermined reference value to output a selection control signal; and a multiplexer for selectively outputting zero or a predetermined gain to said non-linear processor according to the selection control signal.

12. The contour enhancement circuit as claimed in claim 7, wherein said coring value generator comprises:

a median filter for median-filtering the luminance signal to output a median value;

a subtractor for subtracting an output of said median filter from the input luminance signal; and an absolute value processor for calculating an absolute value of the output of said subtractor to output the coring value to the non-linear processor.

* * * * *